(12) United States Patent
Hou et al.

(10) Patent No.: US 10,957,950 B1
(45) Date of Patent: Mar. 23, 2021

(54) HEATING MODULE, HEATING METHOD FOR BATTERY MODULE, AND HEATING SYSTEM

(71) Applicant: Contemporary Amperex Technology Co., Limited, Ningde (CN)

(72) Inventors: Yizhen Hou, Ningde (CN); Xiyang Zuo, Ningde (CN); Zhimin Dan, Ningde (CN); Wei Zhang, Ningde (CN); Xingyuan Wu, Ningde (CN); Taosheng Zhu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/099,956

(22) Filed: Nov. 17, 2020

Related U.S. Application Data

(63) Continuation of application No. PCT/CN2018/124624, filed on Dec. 28, 2018.

(30) Foreign Application Priority Data

May 22, 2018 (CN) .......................... 201810495084.9

(51) Int. Cl.
*H01M 10/625* (2014.01)
*H01M 10/615* (2014.01)
(Continued)

(52) U.S. Cl.
CPC ....... *H01M 10/615* (2015.04); *H01M 10/486* (2013.01); *H01M 10/625* (2015.04);
(Continued)

(58) Field of Classification Search
CPC ............ H01M 10/615; H01M 10/625; H01M 10/637; H01M 10/657; H01M 10/486; H02J 7/0069; H02J 7/34
See application file for complete search history.

(56) References Cited

U.S. PATENT DOCUMENTS

2012/0306432 A1   12/2012   Xu et al.

FOREIGN PATENT DOCUMENTS

| CN | 102074753 A | 5/2011 |
| CN | 103419666 A | 12/2013 |

(Continued)

OTHER PUBLICATIONS

Machine Translation CN 105356007(A) (Year: 2016).*

(Continued)

*Primary Examiner* — Victoria H Lynch
(74) *Attorney, Agent, or Firm* — Pearne & Gordon LLP

(57) ABSTRACT

The present application discloses a heating module, a heating method for a battery module, and a heating system. The heating module includes: an energy storage unit, a first switch unit, a second switch unit and a control unit. The energy storage unit, a first battery unit in a battery module and the first switch unit may form a first heating loop; the energy storage unit, a second battery unit in the battery module, and the second switch unit may form a second heating loop. The control unit may control the first switch unit or the second switch unit, so as to sequentially switch on, between the first heating loop and the second heating loop, a heating loop where a battery unit with a higher state of charge is located and a heating loop where a battery unit with a lower state of charge is located.

10 Claims, 4 Drawing Sheets

(51) Int. Cl.
   *H01M 10/48* (2006.01)
   *H01M 10/637* (2014.01)
   *H02J 7/00* (2006.01)
   *H02J 7/34* (2006.01)
   *H01M 10/657* (2014.01)

(52) U.S. Cl.
   CPC ....... *H01M 10/637* (2015.04); *H01M 10/657* (2015.04); *H02J 7/0069* (2020.01); *H02J 7/34* (2013.01)

(56) References Cited

FOREIGN PATENT DOCUMENTS

| | | |
|---|---|---|
| CN | 203631703 U | 6/2014 |
| CN | 104282965 A | 1/2015 |
| CN | 105356007 A | 2/2016 |
| CN | 105529508 A | 4/2016 |
| CN | 105680114 A | 6/2016 |
| CN | 105762434 A | 7/2016 |
| CN | 106376104 A | 2/2017 |
| CN | 106608195 A | 5/2017 |
| CN | 107394294 A | 11/2017 |
| CN | 108736107 A | 11/2018 |
| JP | 2010238553 A | 10/2010 |
| JP | 2015201303 A | 11/2015 |

OTHER PUBLICATIONS

The First Official Action and search report dated Aug. 2, 2019 for Chinese application No. 2018104950849, 8 pages.
The Notice of Allowance and Supplementary search report dated May 8, 2020 for Chinese application No. 201810495084.9, 5 pages.
PCT International Search Report and Written Opinion for International Application Na PCT/CN2018/124624, dated Apr. 9, 2019, 12 pages. (ISR in English).

* cited by examiner

HEATING MODULE, HEATING METHOD FOR BATTERY MODULE, AND HEATING SYSTEM

CROSS-REFERENCE TO RELATED APPLICATIONS

This application is a continuation of International Application No. PCT/CN2018/124624, filed on Dec. 28, 2018, which claims priority from Chinese patent application No. 201810495084.9, entitled "HEATING MODULE, HEATING METHOD FOR BATTERY MODULE, AND HEATING SYSTEM", filed on May 22, 2018, both of which are incorporated herein by reference in their entireties.

TECHNICAL FIELD

The present application relates to the field of battery technology, and in particular, to a heating module, a heating method for a battery module, and a heating system.

BACKGROUND

When the temperature is lower than 0° C., the charging and discharging performance of a battery module will be greatly affected, for example, at minus 30° C., the charging and discharging performance of the battery module is extremely terrible, therefore, major battery module manufacturers and also vehicle manufactures are working to develop heating systems for battery module working in low temperature environments.

In the prior art, a heating method for a battery module mainly includes: installing a resistance element between cells of the battery module or introducing a heating liquid between the battery cells, using electricity from the city power or the power grid to heat the aforementioned resistance element or the liquid, and using the heat generated by the heating to heat the battery module.

SUMMARY

Embodiments of the present application provide a heating module, a heating method for a battery module, and a heating system, which can implement self-discharging and self-charging of a battery module and implement heating of the battery module in an environment where heating facilities supported by the city power or the power grid are not provided.

In a first aspect, the embodiments of the present application provide a heating module configured to heat a battery module of a battery pack, where the battery module includes a first battery unit and a second battery unit connected in series, and the heating module includes: an energy storage unit, a first switch unit, a second switch unit and a control unit;

a first end of the energy storage unit is connected with a positive electrode of the first battery unit, a negative electrode of the first battery unit is connected with an input end of the first switch unit, and an output end of the first switch unit is connected with a second end of the energy storage unit, so as to form a first heating loop;

the first end of the energy storage unit is further connected with a negative electrode of the second battery unit, a positive electrode of the second battery unit is connected with an output end of the second switch unit, and an input end of the second switch unit is connected with the second end of the energy storage unit, so as to form a second heating loop;

the control unit is configured to control the first switch unit or the second switch unit according to states of charge of the first battery unit and the second battery unit of the battery module having a demand for being heated, so as to sequentially switch on, between the first heating loop and the second heating loop, a heating loop where a battery unit with a higher state of charge is located and a heating loop where a battery unit with a lower state of charge is located, so that the battery module is in a state of being continuously charged and discharged and the battery module is heated with electric energy generated during the continuous discharging and charging.

In a second aspect, the embodiments of the present application provide a heating method for a battery module, used to heat the battery module of a battery pack, where the battery module includes a first battery unit and a second battery unit connected in series. The heating method for a battery module includes: respectively constructing heating loops for the first battery unit and the second battery unit of the battery module having a demand for being heated, and transferring, between the first battery unit and the second battery unit, electric power in a battery unit with a higher state of charge to a battery unit with a lower state of charge, so that the battery module is in a state of being continuously charged and discharged and the battery module is heated with electric energy generated during the continuous discharging and charging.

In a third aspect, the embodiments of the present application provide a heating system for heating at least one battery module, where the battery module includes a first battery unit and a second battery unit connected in series, each battery unit includes at least one battery cell, where the heating system includes at least one heating module that is in one-to-one correspondence with the at least one battery module, and each heating module is the heating module according the first aspect.

As described above, according to the heating module in the embodiments of the present disclosure, substantially, two heating loops of the battery module are constructed based on the energy storage unit, the first switch unit and the second switch unit, and with the utilization of the control unit, the electric power in the battery unit with the higher state of charge can be transferred to the battery unit with the lower state of charge through the first heating loop and the second heating loop which are sequentially switched on, so that the battery module is in the state of being continuously discharged and charged (that is, self-discharging and self-charging), and the battery module is heated by the electric energy generated during the process of continuous discharging and charging. Through the above arrangement, the battery module can be heated without an external power source, such as electricity from the city power or the power grid, and the above arrangement is suitable for heating the battery module in the environment where heating facilities supported by the city power or the power grid are not provided and has high environmental adaptability.

In addition, according to the embodiments of the present disclosure, the energy storage unit, the first switch unit, and the second switch unit can each be connected to the battery module as external devices, therefore, a battery heating function can be conveniently added to the vehicle simply by interfacing the heating module according to the embodiments of the present disclosure with a reserved wiring harness structure in the battery module without the need to disassemble and modify the battery module, which is suitable for the type of vehicle which does not have a battery heating function itself.

DESCRIPTION OF EXAMPLE CONFIGURATIONS

Features and exemplary embodiments of various aspects of the present application will be described in detail below. In the following detailed description, many specific details are proposed in order to provide a comprehensive understanding of the present application.

The inventor of the present application found that the heating system for battery module in the prior art needs to use electricity from the city power or the power grid, and cannot heat the battery module in an environment where heating facilities supported by the city power or the power grid are not provided.

The embodiments of the present application provide a heating module, a heating method for a battery module, and a heating system. The heating module can self-discharge and self-charge a battery pack to realize rapid heating of the battery pack.

It should be noted that the battery pack according to the embodiments of the present application may include lithium ion batteries, lithium metal batteries, lead-acid batteries, nickel barrier batteries, nickel hydrogen batteries, lithium sulfur batteries, lithium air batteries or sodium ion batteries, which is not limited herein. In terms of scale, the battery pack may be a battery cell or a battery pack, which is not limited herein, or the battery pack may include at least one battery module, and each battery module includes at least one battery cell.

Figure 1:
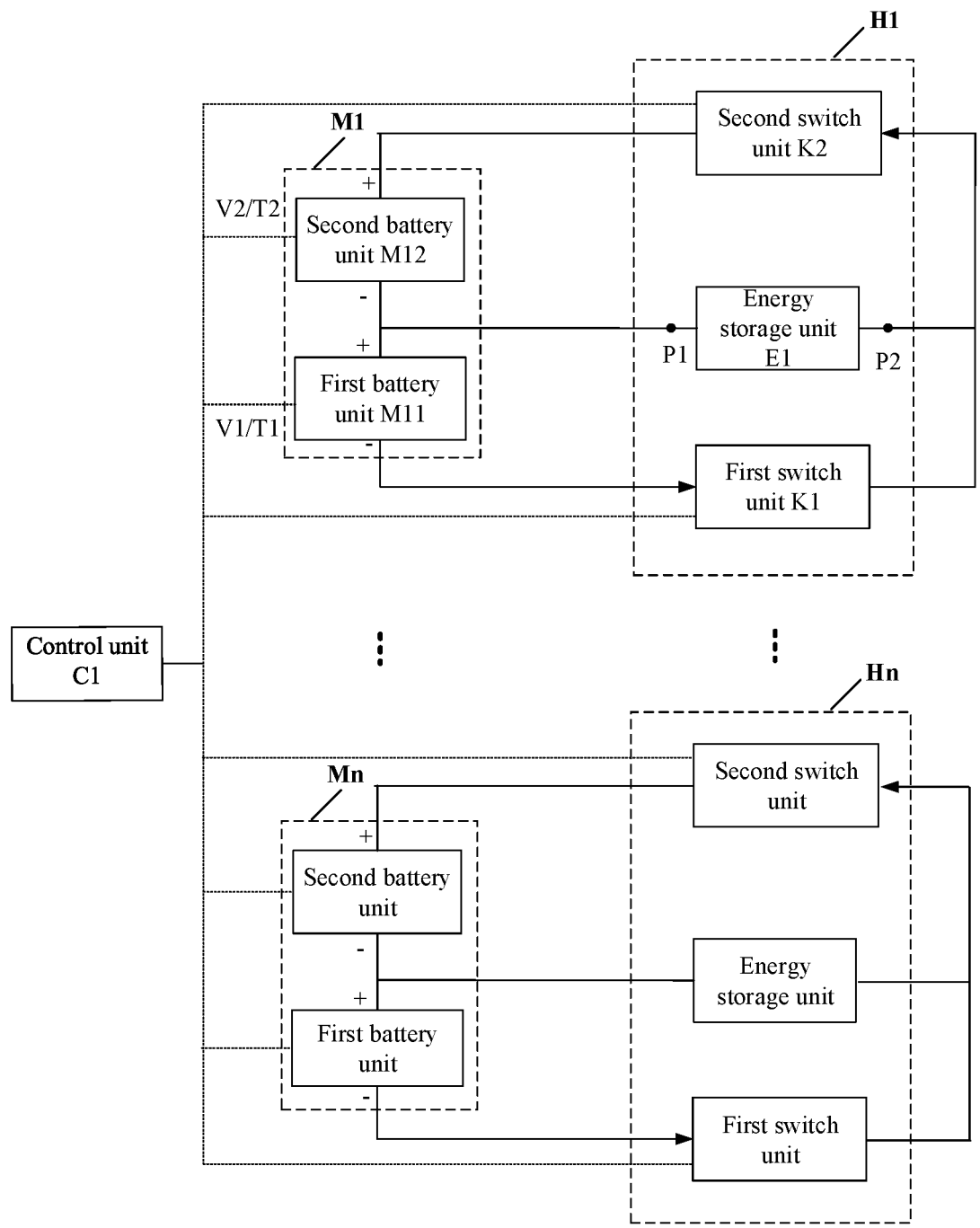
FIG. 1 is a schematic structural diagram of a heating module according to a first embodiment of the present application.

FIG. 1 is a schematic structural diagram of a heating module according to a first embodiment of the present application, which is configured to heat a battery module, where the heating module and the battery module is in one-to-one correspondence.

The battery pack shown in FIG. 1 includes n battery modules (M1 . . . Mn). Each battery module may include a first battery unit and a second battery unit connected in series, and each battery unit may include at least one battery cell. Taking the battery module M1 as an example, the battery module M1 includes a first battery unit M11 and a second battery unit M12 connected in series.

FIG. 1 also shows a heating module H1 corresponding to the battery module M1 and a heating module Hn corresponding to the battery module Mn. As shown in FIG. 1, the heating module H1 includes an energy storage unit E1, a first switch unit K1, a second switch unit K2 and a control unit C1.

A first end P1 of the energy storage unit E1 is connected with a positive electrode of the first battery unit M11, a negative electrode of the first battery unit M11 is connected with an input end (see the indication of arrow in FIG. 1) of the first switch unit K1, and an output end of the first switch unit K1 is connected with a second end P2 of the energy storage unit E1, so as to form a first heating loop.

The first end P1 of the energy storage unit E1 is further connected with a negative electrode of the second battery unit M12, a positive electrode of the second battery unit M12 is connected with an output end (see the indication of arrow in FIG. 1) of the second switch unit K2, and an input end of the second switch unit K2 is connected with the second end P2 of the energy storage unit E1, so as to form a second heating loop.

Exemplarily, the energy storage unit E1 may be an energy storage device with charging and discharging characteristics, such as a large-capacity capacitor, which is not limited herein.

With reference to FIG. 1, it can be seen that the first battery unit M11, the energy storage unit E1 and the first switch unit K1 form the first heating loop, and if the storage of the energy storage unit E1 is empty, after the first heating loop is switched on, the first battery unit M11 can charge the energy storage unit E1; and if the storage of the energy storage unit E1 is full, after the first heating loop is switched on, the energy storage unit E1 can discharge the first battery unit M11.

With reference to FIG. 1, it can also be seen that the second battery unit M12, the energy storage unit E1 and the second switch unit K2 form the second heating loop, similarly, if the storage of the energy storage unit E1 is empty, after the second heating loop is switched on, the second battery unit M12 can charge the energy storage unit E1; and if the storage of the energy storage unit E1 is full, after the second heating loop is switched on, the energy storage unit E1 can charge the second battery unit M12.

As described above, according to the heating module in the embodiments of the present application, substantially, two heating loops of the battery module are constructed based on the energy storage unit E1, the first switch unit K1 and the second switch unit K2, and with the utilization of the control unit C1, the electric power in the battery unit with the higher state of charge can be transferred to the battery unit with the lower state of charge through the first heating loop and the second heating loop which are sequentially switched on, so that the battery module is in the state of being continuously discharged and charged (that is, self-discharging and self-charging), and the battery module is heated by the electric energy generated during the process of continuous discharging and charging. Through the above arrangement, the battery module can be heated without an external power source, such as electricity from the city power or the power grid, and the above arrangement is suitable for heating the battery module in the environment where heating facilities supported by the city power or the power grid are not provided and has high environmental adaptability.

Exemplarily, a resistance element used to heat the battery module may include a PTC plate and/or a heating film disposed on the battery module, for example, disposed between battery cells, and the resistance element may also a heating liquid introduced into the battery cells, which is not limited herein. For a resistance module that is not provided with the above-mentioned resistance element, the heat generated by heating the internal resistance of the batteries connected to respective heating loops can be used to heat the battery module.

In an optional embodiment, a wire harness or copper bar extends between the positive electrode of the first battery unit M11 and the negative electrode of the second battery unit M12, and the first end P1 of the energy storage unit E1 is connected with the wire harness or the copper bar.

According to the embodiments of the present application, the energy storage unit, the first switch unit, and the second switch unit can each be connected to the battery module as external devices, therefore, a battery heating function can be conveniently added to the vehicle simply by interfacing the heating module according to the embodiments of the present application with a reserved wiring harness structure in the battery module without the need to disassemble and modify the battery module, which is suitable for the type of vehicle which does not have a battery heating function itself.

It should be noted that, according to the embodiment of the present application, the control unit C1 may be arranged in a distributed manner, that is, there is one control unit provided for each heating module; or alternatively, the control unit C1 may be arranged in an integrated manner, that is, one control unit is shared between multiple heating modules.

In an optional embodiment, the control unit C1 may also be integrated in a battery management system (BMS), so as to avoid increasing the cost of hardware modification.

Figure 2:
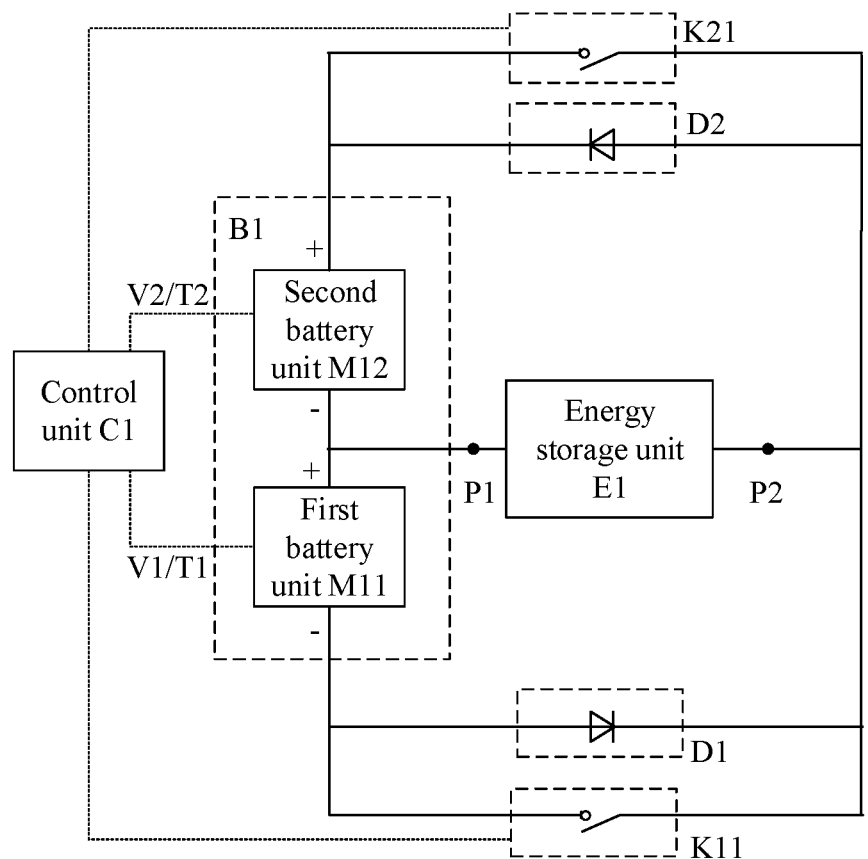
FIG. 2 is a schematic structural diagram of a heating module according to a second embodiment of the present application.

FIG. 2 is a schematic structural diagram of a heating module according to a second embodiment of the present application, showing the specific components of the first switch unit K1 and the second switch unit K2 in FIG. 1.

As shown in FIG. 2, the first switch unit K1 includes a first unidirectional rectifier D1 and a switch device K11, and the second switch unit K2 includes a second unidirectional rectifier D2 and a switch device K21.

An input end of the first unidirectional rectifier D1 is connected with the negative electrode of the first battery unit M11, an output end of the first unidirectional rectifier D1 is connected with the second end P2 of the energy storage unit E1, the switch device K11 is connected in parallel to the two ends of the first unidirectional rectifier D1, and the first end of the energy storage unit E1 is connected with the positive electrode of the first battery unit M11.

An input end of the second unidirectional rectifier D2 is connected with the second end P2 of the energy storage unit E1, an output end of the second unidirectional rectifier D2 is connected with the positive electrode of the second battery unit M12, the second switch device K21 is connected in parallel to the two ends of the second unidirectional rectifier D2, and the first end of the energy storage unit E1 is further connected with the negative electrode of the second battery unit M12.

As can be seen from FIG. 2, when the switch device K11 is turned on, due to the reverse effect of the first unidirectional rectifier D1, the first battery unit M11 and the energy storage unit E1 form a heating loop, and at this time, the first battery unit M11 charges the energy storage unit E1. After the charging is completed, the energy storage unit E1 is equivalent to a power source, where the end P2 is the positive electrode of the power source, and the end P1 is the negative electrode of the power source. Since the switch device K11 and the switching device K21, when in a normal state, are both turned off, when the switch device K11 is turned off, the energy storage unit E1, the second unidirectional rectifier D2 and the second battery unit M12 form a heating loop, and the energy storage unit E1 charges the second battery unit M12 and transfers the electric power in the first battery unit M11 to the second battery unit M12, where the electric energy generated in the transfer process of the electric power is used to heat the battery module.

Similarly, when the switch device K21 is turned on, due to the reverse effect of the second unidirectional rectifier D2, the second battery unit M12 and the energy storage unit E1 form a heating loop, and at this time, the second battery unit M12 charges the energy storage unit E1. After the charging is completed, the energy storage unit E1 is equivalent to a power source, where the end P1 is the positive electrode of the power source, and the end P2 is the negative electrode of the power source. Since the switch device K11 and the switching device K21, when in a normal state, are both turned off, when the switch device K21 is turned off, the energy storage unit E1, the first unidirectional rectifier D1 and the first battery unit M11 form a heating loop, and the energy storage unit E1 charges the first battery unit M11 and transfers the electric power in the second battery unit M12 to the first battery unit M11, where the electric energy generated in the transfer process of the electric power is used to heat the battery module.

Figure 3:
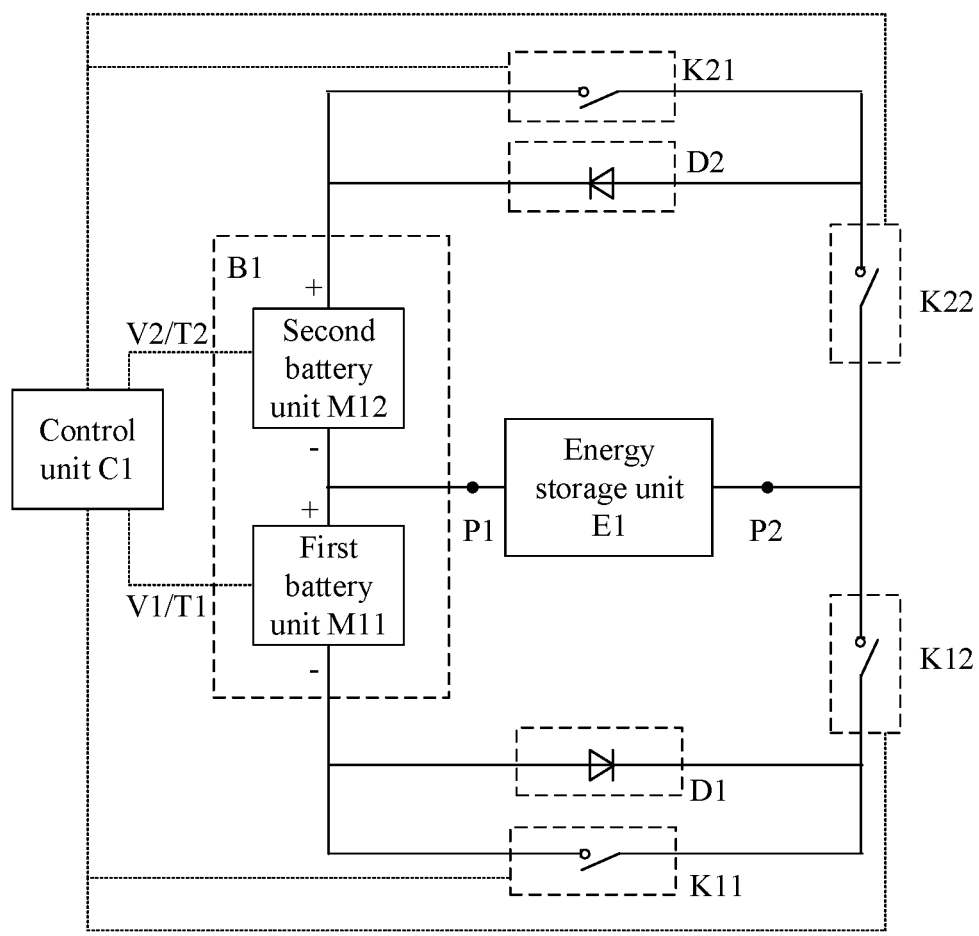
FIG. 3 is a schematic structural diagram of a heating module according to a third embodiment of the present application.

Considering the states of charge in the same battery module, that is, the remaining SOC (State of Charge) electric power may be different, the operating principles of the switch devices K11 and K12 in FIG. 3 are described in detail below based on the states of charge of the first battery unit M11 and the second battery unit M12, that is, the transfer direction of electric power between the first battery unit M11 and the second battery unit M12.

In the first transfer mode of electric power, when the state of charge of the first battery unit M11 is higher than the state of charge of the second battery unit M12 of the battery module with a demand for being heated, the switch device K11 is turned on to switch on a heating loop formed by the first battery unit M11, the energy storage unit E1 and the switch device K11, and the switch device K11 is turned off to switch on a heating loop formed by the energy storage unit E1, the second unidirectional rectifier D2 and the second battery unit M12, so that the state of charge of the first battery unit M11 is transferred the second battery unit M12.

In the second transfer mode of electric power, when the state of charge of the first battery unit M11 is lower than the state of charge of the second battery unit M12 of the battery module with a demand for being heated, the switch device K21 is turned on to switch on a heating loop formed by the second battery unit M12, the energy storage unit E1 and the switch device K21, and the switch device K21 is turned off to switch on a heating loop formed by the energy storage unit E1, the first unidirectional rectifier D1 and the first battery unit M11, so that the state of charge of the second battery unit M12 is transferred the first battery unit M11.

Combined with Joule's law: $Q=I^2R_xT$, it can be seen that the heat Q produced in the heating loop is proportional to the current value $I^2$ and resistance value $R_x$ of the heating circuit, and the heating time T, where the current value I in the heating loop has the largest influence factor on the heat Q.

The heating element in the each heating loops in FIG. 2 only involves the internal resistance of the battery, therefore, the positive electrode and the negative electrode in the heating loop are instantly short-circuited when any heating loop is switched on, thereby generating a large current that generates a lot of heat when flowing through the internal resistance of the battery in each heating loop, and rapidly heats the battery pack. Therefore, compared with the traditional heating system for battery, the heating module in the embodiment of the present application can shorten the heating time for battery and improve the user's battery heating experience.

The switch device K11 and the switch device K21 can be components that can realize the switching function, for example, the switch device K11 and the switch device K21 may be mechanical switches such as single-pole single-throw switches or single-pole double-throw switches, or electronic switches such as triode and MOS transistors (metal-oxide-semiconductor field effect transistors), which are not limited herein.

The first unidirectional rectifier D1 and the second unidirectional rectifier D2 may be components that can realize a unidirectional conduction function, such as diodes, which are not limited herein.

FIG. 3 is a schematic structural diagram of a heating module according to a third embodiment of the present application, and FIG. 3 is different from FIG. 2 in that: the first switch unit K1 further includes a switch device K12, and the second switch unit K2 further includes a switch device K22.

As shown in FIG. 3, one end of the switch device K12 is connected with the second end P2 of the energy storage unit E1, and the other end of the switch device K12 is respectively connected with the output end of the first unidirectional rectifier D1 and the switch device K11. One end of the switch device K22 is connected with the second end P2 of the energy storage unit E1, and the other end of the switch device K22 is respectively connected with the input end of the second unidirectional rectifier D2 and the switch device K21.

The operating principles of the switch devices K11, K12, K21, and K23 in FIG. 3 are described in detail below based on the remaining electric power of the first battery unit M11 and the second battery unit M12, that is, the transfer direction of electric power between the first battery unit M11 and the second battery unit M12.

In the first transfer mode of electric power, when the state of charge of the first battery unit M11 is higher than the state of charge of the second battery unit M12 of the battery module with a demand for being heated, the switch device K11 and the switch device K12 are synchronously turned on to switch on the discharging loop formed by the first battery unit M11, the energy storage unit E1, the switch device K12 and the switch device K11, and at this time, the first battery unit M11 charges the energy storage unit E1.

After the charging is completed, the switch device K22 may be turned on to switch on the charging loop formed by the energy storage unit E1, the switch device K22, the second unidirectional rectifier D2 and the second battery unit M12, so that the state of charge of the first battery unit M11 is transferred to the second battery unit M12, and the electric energy generated during the transfer process of the electric power is utilized to heat the battery module.

Alternatively, after the charging is completed, the switch device K21 and the switch device K22 may also be synchronously turned on to switch on the charging loop formed by the energy storage unit E1, the switch device K22, the switch device K21 and the second battery unit M12, so that the state of charge of the first battery unit M11 is transferred to the second battery unit M12, and the electric energy generated during the transfer process of the electric power is utilized to heat the battery module.

It should be noted that, the manner turning on the switching device K22 and the manner of synchronously turning on the switch device K21 and the switch device K22 can both realize the transfer of the state of charge in the first battery unit M11 to the second battery unit M12. The difference is that the heating current generated through the manner of synchronously turning on the switch device K21 and the switch device K22 is higher and the heating speed is faster. Those skilled in the art can choose a suitable control manner of switch according to actual needs.

In the second transfer mode of electric power, when the state of charge of the first battery unit M11 is lower than the state of charge of the second battery unit M12 of the battery module with a demand for being heated, the switch device K21 and the switch device K22 are synchronously turned on to switch on the discharging loop formed by the second battery unit M12, the energy storage unit E1, the switch device K21 and the switch device K22, and at this time, the second battery unit M11 charges the energy storage unit E1.

Alternatively, after the charging is completed, the switch device K12 may also be turned on to switch on the charging loop formed by the energy storage unit E1, the first battery unit M11, the first unidirectional rectifier D1 and the switch device K12, so that the state of charge of the second battery unit M12 is transferred to the first battery unit M11, and the electric energy generated during the transfer process of the electric power is utilized to heat the battery module.

It should be noted that, the manner turning on the switching device K22 and the manner of synchronously turning on the switch device K21 and the switch device K22 can both realize the transfer of the state of charge in the second battery unit M12 to the first battery unit M11. The difference is that the heating current generated through the manner of synchronously turning on the switch device K21 and the switch device K22 is higher and the heating speed is faster. Those skilled in the art can choose a suitable control manner of switch according to actual needs.

Figure 4:
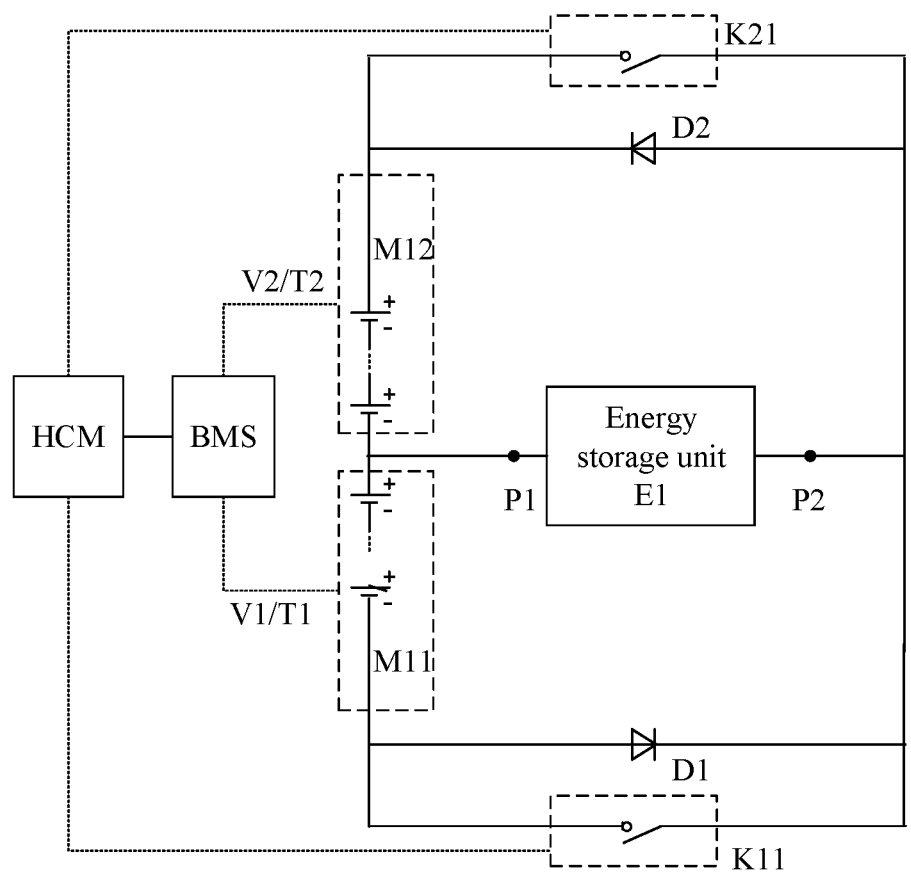
FIG. 4 is a schematic structural diagram of a heating module according to a fourth embodiment of the present application.

FIG. 4 is a schematic structural diagram of a heating module according to a fourth embodiment of the present application, and FIG. 4 is different from FIG. 3 in that the control unit in FIG. 4 includes a BMS and a heat control module (HCM).

FIG. 4 also shows a detailed structure of the battery module. The battery cells connected in series are assembled into the first battery unit M11 and the second battery unit M12, and the first battery unit M11 and the second battery unit are connected in series to form the battery module M1.

In the following, referring to FIG. 3, the working principle of the heating module in the embodiment of the present application is described in detail by taking a unidirectional rectifier as diode as an example:

(1) After the BMS is powered on, the BMS determines whether the battery module M1 has a demand for being heated according to a temperature T1 of the battery unit M11 and a temperature T2 of the battery unit M12. If any one of the temperature T1 and the temperature T2 is lower than a preset temperature threshold T0, it is determined that the battery module M1 has a demand for being heated.

(2) If the battery module M1 has a demand for being heated, the BMS wakes up the HCM through the CAN protocol. Since the HCM involves a high-voltage part and a low-voltage part, in order to ensure that the housing of the heating device is not electrically charged, the insulation resistance between the high-voltage side ground and the low-voltage side ground of the HCM may be detected to ensure a short circuit does not occur between the high-voltage side ground and the low-voltage side ground. In addition, the BMS may also be detected for insulation, and then the HCM and the BMS exchange their respective situations regarding insulation resistance through CAN. When it is determined that the insulation resistance of the BMS and the HCM is correct, the HCM determines whether the switch device K11 and the switch device K21 are both turned off.

(3) The BMS calculates the state of charge (SOC1) of the battery unit M11 based on a voltage V1, and calculates the state of charge (SOC2) of the battery unit M12 based on a voltage V2.

(4) The BMS transmits a control signal, to the HCM, for driving the switch device K11 or the second switch device K21 to turn on or turn off according to a comparison result of SOC1 and SOC2.

As a first comparison result, if SOC1>SOC2, the BMS instructs the HCM to turn on the switch device K11. Due to the reverse effect of the diode D1, at this time, the branch including the battery unit M11, the energy storage unit E1 and the diode D1 is switched off, and the battery unit M11, the energy storage unit E1 and the switch device K11 form a heating loop, and since there is no energy consumption device in the heating loop, that is, the current value in the heating loop will be quite large, the internal resistance in the battery unit M11 can be heated briefly by the large current.

After the energy storage unit E1 is fully charged, the BMS instructs the HCM to turn off the switch device K11, and at this time, the energy storage unit E1 is equivalent to a power source, where the end P2 is the positive electrode of the power source and the end P1 is the negative electrode of the power source. Since the switch device K11 and the switch device K21 are both turned off in a normal state, a heating loop including the energy storage unit E1, the diode D2 and the battery unit M12 can be formed. Since there is no energy-consuming device in the heating loop, the current value in the heating loop will be quite large, the energy storage unit E1 will be emptied in a short period, and the internal resistance in the battery unit M12 can be briefly heated by a large current.

As a second comparison result, if SOC1<SOC2, the BMS instructs the HCM to turn on the switch device K21. Due to the reverse effect of the diode D2, at this time, the branch including the battery unit M12, the energy storage unit E1 and the diode D2 is switched off, and the battery unit M12, the energy storage unit E1 and the switch device K21 form a heating loop, and since there is no energy consumption device in the heating loop, the current value in the heating loop will be quite large, the internal resistance in the battery unit M12 can be heated briefly by the large current.

After the energy storage unit E1 is fully charged, the BMS instructs the HCM to turn off the switch device K21, and at this time, the energy storage unit E1 is equivalent to a power source, where the end P1 is the positive electrode of the power source and the end P2 is the negative electrode of the power source. Since the switch device K11 and the switch device K21 are both turned off in a normal state, a heating loop including the energy storage unit E1, the diode D1 and the battery unit M11 can be formed. Since there is no energy-consuming device in the heating loop, the current value in the heating loop will be quite large, the energy storage unit E1 will be emptied in a short period, and the internal resistance in the battery unit M11 can also be briefly heated by a large current.

In an optional embodiment, the time required for the energy storage unit E1 to be fully charged may be accurately calculated according to a voltage across the energy storage unit E1 and a rated capacity, so as to determine a time length when the switch device K11 or the switch device K21 are turned on, and after the time length is reached, the BMS instructs the HCM to turn off the corresponding switch device.

Similarly, the time required for the energy storage unit E1 to be fully discharged may also be accurately calculated according to a voltage across the energy storage unit E1 and a rated capacity, so as to determine a time length when the switch device K11 or the switch device K21 are turned off, and after the time length is reached, the BMS instructs the HCM to turn on the corresponding switch device again.

It should be noted that, the BMS will continuously detect the temperatures and voltages of the respective battery units in the battery module during the heating process, and determine whether it is necessary to issue a control instruction to enable the heating according to the detected temperatures and voltages, while the HCM is only configured to drive the respective switch devices to perform corresponding operations according to the control instruction.

In an optional embodiment, the heating module may further include a temperature detection unit (not shown) configured to detect the temperatures of the respective battery units and transmit the temperatures to the BMS. Specifically, the temperature detection unit may include contact temperature sensors attached to the respective battery units or non-contact temperature sensors provided near the surfaces of the respective battery units, which is not limited herein.

In an optional embodiment, the heating module may further include a voltage detection unit (not shown) configured to detect the voltages of the respective battery units and transmit the voltages to the BMS. Specifically, the voltage detection module may include voltage detectors provided at the two ends of the respective battery units.

The embodiments of the present application also provide a heating method for a battery module, used to heat the battery module of a battery pack, where the battery module includes a first battery unit and a second battery unit connected in series (see FIG. 1).

The core concept of the heating method for a battery module includes: respectively constructing heating loops for the first battery unit and the second battery unit of the battery module having a demand for being heated, and transferring, between the first battery unit and the second battery unit, electric power in a battery unit with a higher state of charge to a battery unit with a lower state of charge, so that the battery module is in a state of being continuously charged and discharged and the battery module is heated by electric energy generated during continuous discharging and charging.

That is to say, any electrical device that can realize the transfer of the electric power in the battery unit with the higher state of charge between the first battery unit and the second battery unit to the battery unit with the lower state of charge is within the protection scope defined by the present application.

The embodiments of the present application also provide a heating system for a battery module, used to heat the battery module of a battery pack, where the battery module includes a first battery unit and a second battery unit connected in series, and each battery unit includes at least one battery cell.

The heating system includes one or more heating modules in one-to-one correspondence with one or more battery modules; where each heating module is a heating module as described above.

It should be noted that, the functional blocks shown in the block diagrams described above may be implemented in hardware, software, firmware, or a combination thereof. When implemented in hardware, it may be, for example, an electronic circuit, an application specific integrated circuit (ASIC), a suitable firmware, a plug-in, a function card or the like. When implemented in software, elements of the embodiments of the present disclosure are programs or code segments used to perform required tasks. The programs or code segments may be stored in a machine-readable medium or transmitted over a transmission medium or a communication link via data signals carried in carriers. The "machine-readable medium" may include any medium capable of storing or transmitting information. Examples of the machine-readable medium include an electronic circuit, a semiconductor memory device, a ROM, a flash memory, an erasable ROM (EROM), a floppy disk, a CD-ROM, an optical disk, a hard disk, a fiber medium, a radio frequency (RF) link, and the like. The code segments may be downloaded via a computer network, such as the Internet, an intranet, or the like.

The above description is only for the specific embodiments of the present application, but the scope of the present application is not limited thereto, and any changes or substitutions that can be easily conceived by those skilled in the art within the technical scope disclosed by the present application should be covered within the scope of the present application. Therefore, the protection scope of the present application shall be defined by the protection scope of the claims.

What is claimed is:

1. A heating module configured to heat a battery module, wherein the battery module comprises a first battery unit and a second battery unit connected in series, and the heating module is characterized by comprising: an energy storage unit, a first switch unit, a second switch unit and a control unit;
   a first end of the energy storage unit is connected with a positive electrode of the first battery unit, a negative electrode of the first battery unit is connected with an input end of the first switch unit, and an output end of the first switch unit is connected with a second end of the energy storage unit, so as to form a first heating loop;
   the first end of the energy storage unit is further connected with a negative electrode of the second battery unit, a positive electrode of the second battery unit is connected with an output end of the second switch unit, and an input end of the second switch unit is connected with the second end of the energy storage unit, so as to form a second heating loop;
   the control unit is configured to: when the battery module has a demand for being heated, control the first switch unit or the second switch unit according to states of charge of the first battery unit and the second battery unit, so as to sequentially switch on, between the first heating loop and the second heating loop, a heating loop where a battery unit with a higher state of charge is located and a heating loop where a battery unit with a lower state of charge is located, so that the battery module is in a state of being continuously charged and discharged and the battery module is heated by electric energy generated during continuous discharging and charging.

2. The heating module according to claim 1, wherein the first switch unit comprises a first unidirectional rectifier and a first switch device, and the second switch unit comprises a second unidirectional rectifier and a second switch device;
   an input end of the first unidirectional rectifier is connected with the negative electrode of the first battery unit, an output end of the first unidirectional rectifier is connected with the second end of the energy storage unit, and the first switch device is connected in parallel to the two ends of the first unidirectional rectifier;
   an input end of the second unidirectional rectifier is connected with the second end of the energy storage unit, an output end of the second unidirectional rectifier is connected with the positive electrode of the second battery unit, and the second switch device is connected in parallel to the two ends of the second unidirectional rectifier;
   the control unit is configured to:
   when the battery module has a demand for being heated and the state of charge of the first battery unit is higher than the state of charge of the second battery unit, turn on the first switch device to switch on a discharging loop formed by the first battery unit, the energy storage unit and the first switch device, and turn off the first switch device to switch on a charging loop formed by the energy storage unit, the second unidirectional rectifier and the second battery unit; or
   when the battery module has a demand for being heated and the state of charge of the first battery unit is lower than the state of charge of the second battery unit, turn on the second switch device to switch on a discharging loop formed by the second battery unit, the energy storage unit and the second switch device, and turn off the second switch device to switch on a charging loop formed by the energy storage unit, the first unidirectional rectifier and the first battery unit.

3. The heating module according to claim 2, wherein the first switch unit further comprises a third switch device, and the second switch unit further comprises a fourth switch device; wherein,
   one end of the third switch device is connected with the second end of the energy storage unit, and the other end of the third switch device is respectively connected with the output end of the first unidirectional rectifier and the first switch device;
   one end of the fourth switching device is connected to the second end of the energy storage unit, and the other end of the fourth switching device is respectively connected to the input end of the second unidirectional rectifier and the second switching device;
   the control unit is further configured to:
   when the battery module has a demand for being heated and the state of charge of the first battery unit is higher than the state of charge of the second battery unit, synchronously turn on the first switch device and the third switch device to switch on a discharging loop formed by the first battery unit, the energy storage unit, the first switch device and the third switch device, and turn on the fourth switch device to switch on a charging loop formed by the energy storage unit, the fourth switch device, the second unidirectional rectifier and the second battery unit; or
   when the battery module has a demand for being heated and the state of charge of the first battery unit is lower than the state of charge of the second battery unit, synchronously turn on the second switch device and the fourth switch device to switch on a discharging loop formed by the second battery unit, the energy storage unit, the second switch device and the fourth switch device, and turn on the third switch device to switch on a charging loop formed by the energy storage unit, the first battery unit, the first unidirectional rectifier and the third switch device.

4. The heating module according to claim 3, wherein the control unit is further configured to:

after the discharging loop formed by the first battery unit, the energy storage unit, the first switch device and the third switch device is switched on, synchronously turn on the second switch device and the fourth switch device to switch on a charging loop formed by the energy storage unit, the fourth switch device, the second switch device and the second battery unit; or;

after the discharging loop formed by the second battery unit, the energy storage unit, the second switch device and the fourth switch device is switched on, synchronously turn on the first switch device and the third switch device to switch on a charging loop formed by the energy storage unit, the third switch device, the first switch device and the first battery unit.

5. The heating module according to claim 3, wherein the first unidirectional rectifier and the second unidirectional rectifier are diodes.

6. The heating module according to claim 2, wherein the first unidirectional rectifier and the second unidirectional rectifier are diodes.

7. The heating module according to claim 1, wherein the heating module further comprises a voltage detection unit configured to detect voltages of respective battery units and transmit the voltages to the control unit; the control unit is configured to calculate states of charge of the respective battery units according to the voltages.

8. The heating module according to claim 1, wherein the heating module further comprises a temperature detection unit configured to detect temperatures of respective battery units and transmit the temperatures to the control unit; the control unit is configured to determine, when a temperature of any battery unit is lower than a preset threshold, the battery module including the battery unit has a demand for being heated.

9. The heating module according to claim 1, wherein a wire harness or a copper bar extends between the positive electrode of the first battery unit and the negative electrode of the second battery unit, and the first end of the energy storage unit is connected with the wire harness or the copper bar.

10. A heating system for heating at least one battery module, wherein the battery module comprises a first battery unit and a second battery unit connected in series, each battery unit comprises at least one battery cell, and the heating system is characterized by comprising at least one heating module corresponding to the at least one battery module, wherein each heating module is the heating module according to claim 1.

* * * * *